US006694345B1

(12) United States Patent
Brelsford et al.

(10) Patent No.: US 6,694,345 B1
(45) Date of Patent: Feb. 17, 2004

(54) EXTERNAL JOB SCHEDULING WITHIN A DISTRIBUTED PROCESSING SYSTEM HAVING A LOCAL JOB CONTROL SYSTEM

(75) Inventors: David Paul Brelsford, Hyde Park, NY (US); Joseph Francis Skovira, Owego, NY (US)

(73) Assignee: International Business Machines Corporatioin, Armonk, NY (US)

(*) Notice: Subject to any disclaimer, the term of this patent is extended or adjusted under 35 U.S.C. 154(b) by 0 days.

(21) Appl. No.: 09/412,932

(22) Filed: Oct. 5, 1999

(51) Int. Cl.[7] .................................................. G06F 9/00
(52) U.S. Cl. ........................ 709/100; 709/102; 709/104
(58) Field of Search ................................ 709/100, 102, 709/104; 707/103 R; 717/127

(56) References Cited

U.S. PATENT DOCUMENTS

| | | | |
|---|---|---|---|
| 4,633,387 A | 12/1986 | Hartung et al. | 364/200 |
| 5,363,175 A | 11/1994 | Matysek | 355/208 |
| 5,414,845 A | 5/1995 | Behm et al. | 395/650 |
| 5,437,032 A | 7/1995 | Wolf et al. | 395/650 |
| 5,794,005 A | 8/1998 | Steinman | 395/500 |
| 5,799,149 A | 8/1998 | Brenner et al. | 395/200 |

OTHER PUBLICATIONS

IBM Technical Disclosure Bulletin, "Dynamic Load Sharing for Distributed Computing Environment", vol. 38, No. 7, Jul. 1995, pp. 511–515.

IBM Technical Disclosure Bulletin, "Non–Deterministic Dynamic Query for Job Re–Direction Mechanism", vol. 38, No. 7, Jul. 1995, pp. 329.

IBM Technical Disclosure Bulletin, "Distributed Parallel Build System for Hierarchically Organized Large Scale Software Systems", vol. 39, No. 6, Jun. 1996, pp. 63–68.

IBM Technical Disclosure Bulletin, "Method of Compute Resource Allocation in a Batch Job Submission Environment", vol. 40, No. 7, Jul. 1997, pp. 7–8.

IBM Technical Disclosure Bulletin, "Load Level Scheduler", vol. 33, No. 12, May 1991, pp. 429–432.

*Primary Examiner*—John Follansbee
*Assistant Examiner*—George L. Opie
(74) *Attorney, Agent, or Firm*—Lawrence D. Cutter, Esq.; Kevin P. Radigan, Esq.; Heslin Rothenberg Farley & Mesiti P.C.

(57) ABSTRACT

External job scheduling capabilities are provided to a local job control system lacking or having insufficient job scheduling capabilities. This is accomplished by encapsulating running of a user job by the local job control system (LJCS) within running of a marker job at a node management system, which is responsive to an external resource scheduler. The technique includes starting a marker job by the resource scheduler external to the local job control system, wherein the marker job corresponds to a user job to be run by the LJCS; responsive to starting of the marker job, starting the user job by the LJCS; and upon termination of the user job, ending the marker job started by the resource scheduler, wherein starting of the user job by the LJCS is responsive to the resource scheduler's starting of the marker job and wherein ending of the marker job is responsive to termination of the user job.

31 Claims, 7 Drawing Sheets

LOGIC FOR DETECTION OF NEW LJCS JOBS SUBMITTED BY USERS:

READ NODE AND JOB QUEUE INFORMATION FROM LL

READ "QUEUED" INFORMATION FROM LJCS — THESE ARE JOBS SUBMITTED BY USERS

FOR ALL JOBS ON BOTH LISTS}

COMPARE THE LL JOB QUEUE TO THE LJCS "QUEUED" LIST

IF A JOB IS ON "QUEUED" BUT NOT ON THE LL JOB QUEUE}

THIS IS A NEW JOB

GET USER INFORMATION FROM LJCS JOB CARD RECORD. INFORMATION INCLUDES:

NUMBER OF NODES, ESTIMATED WALLCLOCK TIME, JOB NAME

CALL BUILDCOMMANDFILE (BCF) TO BUILD THE LL JOB COMMAND FILE

SUBMIT THE JOB TO LL

ENDIF
ENDFOR

*fig. 3*

LOGIC FOR THE BUILDCOMMANDFILE (BCF) ROUTINE:

SETUP ESSENTIAL LL KEYWORDS IN THE COMMAND FILE. THESE INCLUDE:
    INPUT, OUTPUT, ERROR DIRECTORIES, NUMBER OF NODES, WALLCLOCK ESTIMATE
NEXT, RUN SCRIPT COMMANDS WITHIN THE LL COMMAND FILE TO CONTROL JOB EVOLUTION.
    THESE COMMANDS WILL BE EXECUTED ONCE THE JOB IS SCHEDULED TO RUN
START THE ASSOCIATED JOB IN LJCS
START A TIMER WITH VALUE=T1

IF THE JOB IS NOT PLACED ON THE LJCS RUNNING QUEUE BY TIMER EXPIRATION{
    LJCS FAILED TO START THE JOB
    EXIT THE SHELL SCRIPT
} ELSE{
    LJCS HAS STARTED THE JOB

START A TIMER
FOR (; TIMER <=WALLCLOCK;) {
    IF JOB EXITS THE LJCS RUNNING QUEUE
        THE JOB HAS COMPLETED
        EXIT THE SHELL SCRIPT WHICH ENDS THE LL JOB
    } ENDIF
} ENDFOR

IF WE GET HERE, THE WALLCLOCK TIMER HAS EXPIRED WITH THE JOB REMAINING ON THE LJCS
RUNNING QUEUE.
    CANCEL THE JOB IN LJCS TO REMOVE IT FROM THE RUNNING QUEUE
    WAIT FOR THE JOB TO LEAVE THE RUNNING QUEUE.
    EXIT THE SHELL SCRIPT WHICH ENDS THE LL JOB.
ENDIF

*fig. 4*

EXTERNAL JOB SCHEDULING WITHIN A DISTRIBUTED PROCESSING SYSTEM HAVING A LOCAL JOB CONTROL SYSTEM

TECHNICAL FIELD

This invention broadly relates to data processing techniques, and more particularly, to a technique for external job scheduling within a distributed processing system having a preexisting "local" job control system with inadequate job scheduling capabilities.

BACKGROUND OF THE INVENTION

A collection of autonomous machines connected by a network and unified by appropriate software and management policies is itself a computer system. This concept of a network-based computer system continues to become more and more significant in the computer industry. Network-based computers include more than a client-server computing and its emphasis on two party relationship. In network-based computing, a service (or resource) becomes a more general concept and no longer needs to be tied to a single machine; rather, it becomes a feature of the whole network-based computer. A network-based computer, or environment, can arise in a number of contexts such as in a heterogenous collection of user workstations and server machines on a local area network; in a special purpose "clustered" machine consisting of individual processors connected by a high-speed network; or in a campus or enterprise or global network connecting several such environments together.

An important component in all of these environments is a resource management system, and a significant aspect of the resource management system is its job scheduling capability. Oftentimes, a distributed processing system may have an existing approach to managing jobs within the distributed system. This existing approach, referred to herein as a "local job control system" may or may not possess rudimentary job scheduling capabilities. In many such systems, job scheduling can be thought of as manual in that an operator or user of the system starts a job and the local job control system simply monitors the progress of the job.

For a variety of reasons, applicants have determined it desirable to maintain the local job control system, while at the same time providing the local system with an enhanced and automatic external job scheduling capability.

DISCLOSURE OF THE INVENTION

Briefly summarized, the invention comprises in one aspect a method for processing jobs within a distributed processing system having a local job control system (LJCS) which receives user jobs to be processed. The method includes: starting a marker job by a resource scheduler external to the local job control system, wherein the marker job corresponds to a user job to be run by the LJCS; responsive to starting of the marker job by the resource scheduler, starting the user job by the LJCS; and upon termination of the user job, ending the marker job started by the resource scheduler, wherein starting of the user job by the LJCS is responsive to the resource scheduler's starting of the marker job and wherein ending of the marker job is responsive to termination of the user job by the LJCS.

In another aspect, a system for processing jobs within a distributed processing system is provided. The distributed processing system has a local job control system (LJCS) which receives user jobs to be processed. The system includes a resource scheduler located external to the LJCS which has means for starting a marker job, wherein the marker job corresponds to a user job to be run by the LJCS. This system further includes means for starting the user job by the LJCS responsive to starting of the marker job by the resource scheduler, and thereafter, means for ending the marker job started by the resource scheduler upon termination of the user job. Thus, the means for starting of the user job by the LJCS is responsive to the resource scheduler's means for starting the marker job and the means for ending the marker job is responsive to termination of the user job.

In a further aspect, at least one program storage device, readable by a machine, tangibly embodying at least one program of instructions executable by the machine is provided to perform a method for processing jobs within a distributed processing system having a local job control system (LJCS) which receives user jobs to be processed. The method includes: starting a marker job by a resource scheduler external to the LJCS, wherein the marker job corresponds to a user job to be run by the LJCS; responsive to starting of the marker job by the resource scheduler, starting the user job by the LJCS; and upon termination of the user job, ending the marker job started by the resource scheduler, wherein starting of the user job by the LJCS is responsive to the resource scheduler's starting of the marker job and wherein ending of the marker job is responsive to termination of the user job.

To restate, provided herein is a technique for adding resource scheduling capabilities to a preexisting job control facility which may or may not have its own job scheduler. The technique involves encapsulating running of a user job at the local job control system with starting and ending of a marker job by the resource scheduler. Preferably, the resource scheduler employs a node management system such as the Load Leveler program offered by International Business Machines (IBM) Corp. Using this technique, a client is able to maintain existing interfaces of the local job control system, while at the same time have automatic job scheduling capabilities superimposed onto the system. Further, these capabilities are provided while minimizing any changes to the underlying, preexisting local job control system.

The solution presented effectively closes any opportunity for out-of-synchronization errors between the multiple codes in the solution, i.e., between the external resource scheduler, the node management system and the local job control system. Further, the solution of the present invention is a simple and robust implementation for superimposing an external scheduler over a node management system and local job control system. The customer's code (i.e., local job control system) is preserved without expensive changes to support synchronization between the scheduling subsystems. By subordinating the customer code to the control of the node management system/external resource scheduler, examination of node management system data provides complete information regarding the progress of the customer task.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 3 is pseudocode for implementing one-embodiment for detecting a new user job at the local job control system;

FIG. 4 is pseudocode for implementing one embodiment of a build command file (BCF) routine for a marker job in the node management system in accordance with the principles of the present invention;

BEST MODE FOR CARRYING OUT THE INVENTION

Figure 1:
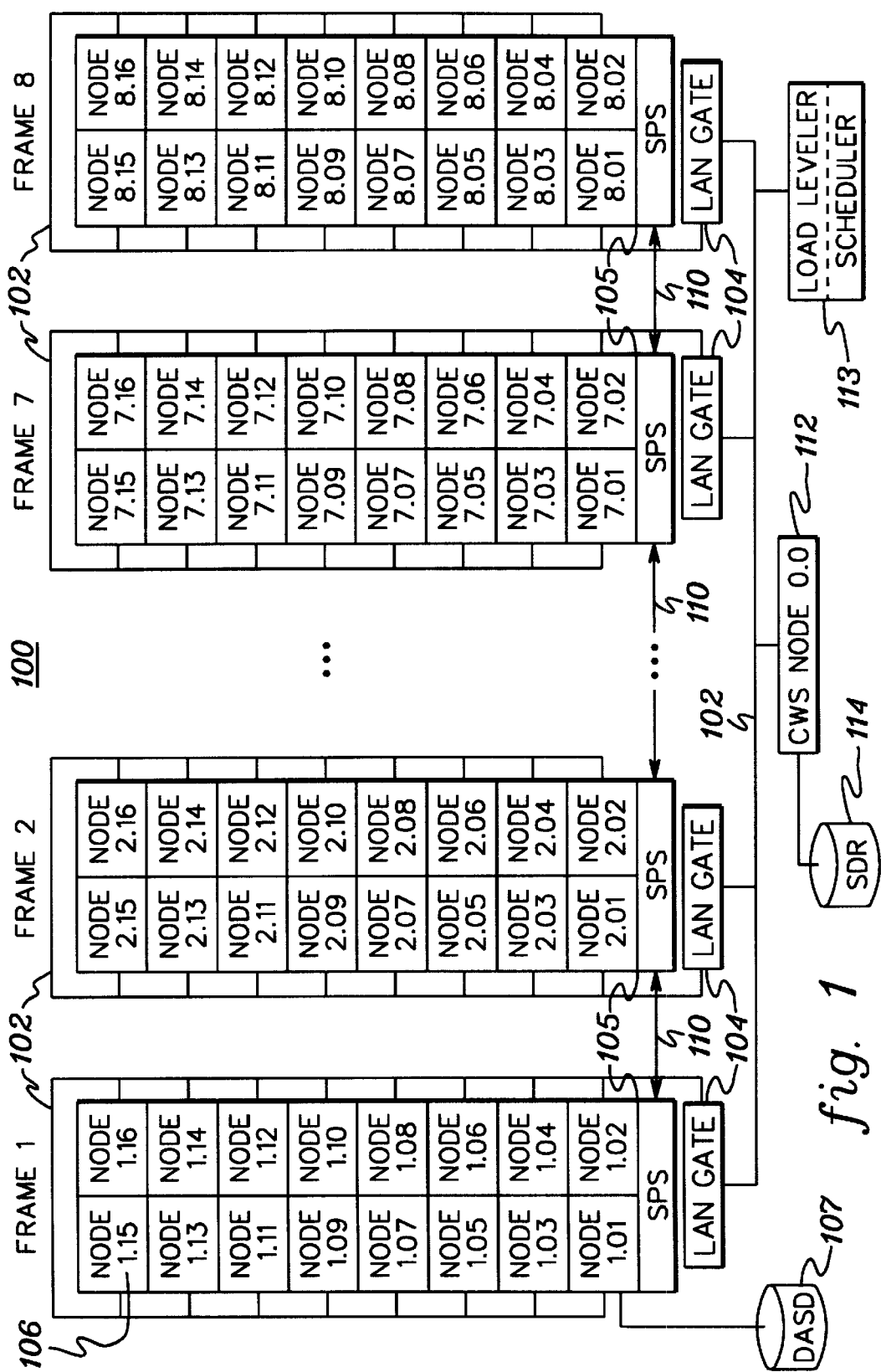
FIG. 1 is a schematic diagram of a distributed data processing system to employ the job scheduling capabilities of the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well-known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102 while messages and data may be sent from one to another of the nodes 106 by means of the high performance switches 105.

Also shown in FIG. 1 is an internal task or job scheduler such as the IBM Load Leveler Parallel Batch Scheduler, along with an external scheduler (separated by a phantom line) and together labeled 113. The Load Leveler Parallel Batch Scheduler is a commercially available product marketed by IBM, and although shown as a discrete block in FIG. 1, actually is a distributed scheduler residing on each node of the distributed processing system. In addition to being a batch system control, the Load Leveler program is also a job scheduler. However, in accordance with the principles of the present invention, an external job scheduler is coupled to the distributed system for administrator control of job processing. Examples of such an external scheduler exist in the art. For example, reference the Easy-II Parallel Job Scheduler which is publically available at Web Page: http://www.tc.cornell.edu. Another example of an external job scheduler commercially available is the Maui External Scheduler supported by Maui High Performance Computing Center of Maui, Hi. In accordance with one embodiment of the present invention, the program code disclosed herein is an enhancement to an external job scheduler such as the Easy-II or Maui Schedulers (which are provided herein by way of example only), as well as an enhancement to the batch system control, such as the referenced Load Leveler program.

Figure 2:
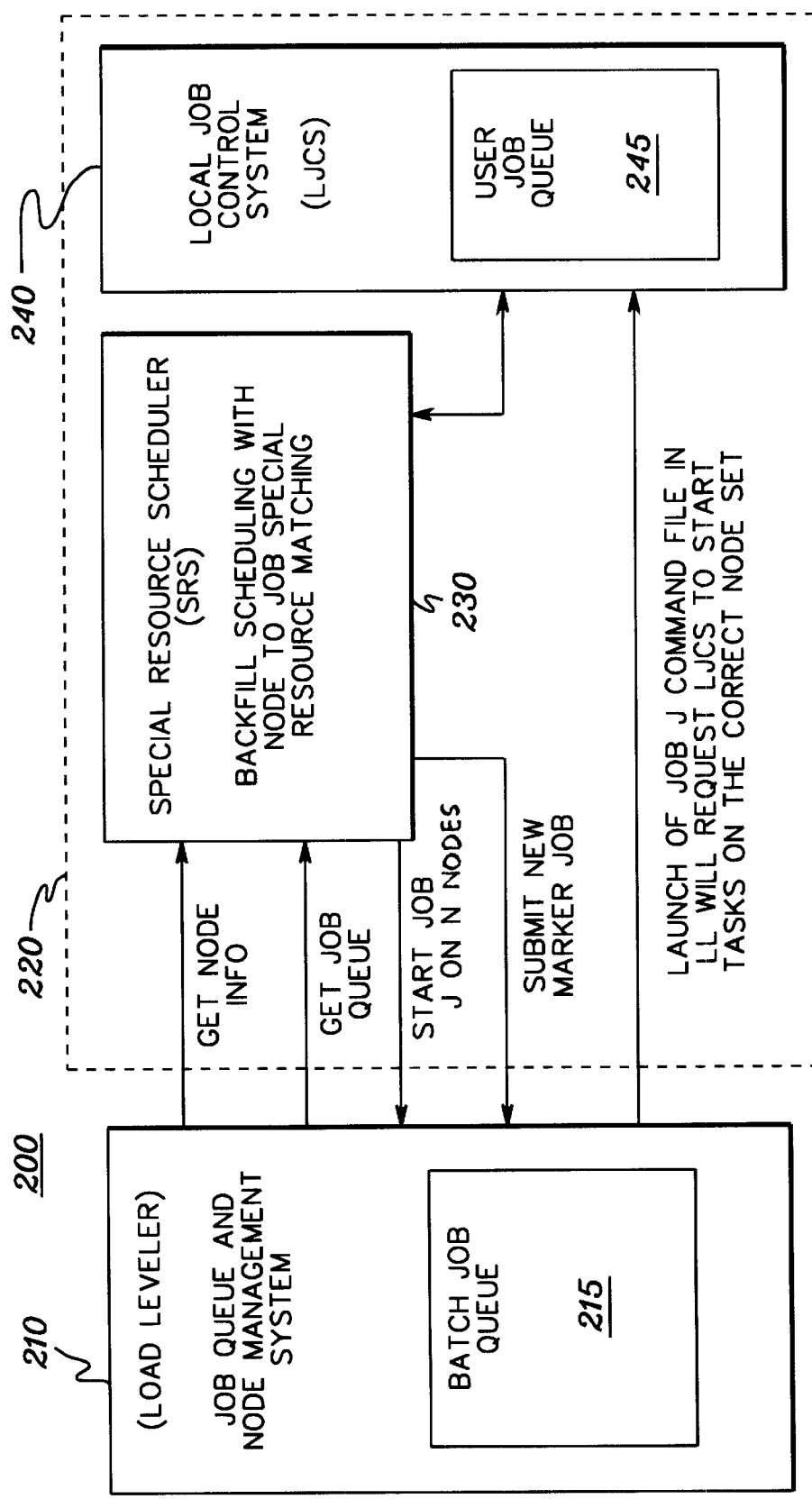
FIG. 2 is a block diagram showing interaction between a local job control system, resource scheduler and node management system in accordance with the job scheduling capabilities of the present invention.

As noted briefly above, the present invention is directed to solving the problem of parallel job scheduling while preserving a customer's job control software, referred to herein as the local job control system. Presented is a solution to the general coordination problem in a distributed processing system which employs a node management system, such as Load Leveler, wherein an external or special resource scheduler (SRS) is provided in addition to the preexisting local job control system, which a customer may wish to maintain with minimal changes because, for example, of its familiarity. FIG. 2 depicts one embodiment of job scheduling logic, generally denoted 200, in accordance with the principles of the present invention. Logic 200 includes a node management system 210, such as the above-referenced Load Leveler system, which includes a batch job queue 215. External to node management system 210 is scheduling and control logic 220, which in this embodiment includes a special resource scheduler (SRS) 230 (such as the Easy-II or Maui Scheduler referenced above) and a local job control system (LJCS) 240, which includes a user job queue 245 containing user or real jobs to be run by the distributed processing system.

Operationally, the SRS performs backfill scheduling with node to job special resource matching. SRS 230 receives node and job information from the node management system 210, and uses this information in making a scheduling decision. In accordance with the principles of the present invention, SRS 230 initiates a "marker job" at the node management system 210, which in turn initiates a build command file routine within node management 210 to send a job command to LJCS 240 to initiate processing of the real job maintained at the user job queue 245. The queue manager at the local job control system therefor responds to the resource scheduler via the starting of the marker job at the node management system. Processing of the real job by the LJCS is monitored and upon its completion or failure, the SRS terminates the marker job at the node management system. Thus, the real or authentic job running in the LJCS is encapsulated between starting and ending of the marker job.

More particularly, external scheduler 230 obtains all node and job information from node management system 210 across the scheduling interface. SRS 230 reads this information once for each scheduling pass. Therefore, each scheduling decision is made using an instantaneous snapshot of the state of the nodes in the job queue at an instant in time. At the completion of each scheduling pass, the node management system information is discarded. At the start of the next pass, the information is again loaded from the node management system 210, thereby refreshing any changed states which the management system has detected. In short, external scheduler 230 treats the node management system 210 information as temporary. By relying on the extensive database capabilities of the node management system, extra copies of the relevant data structures need not be duplicated within the external scheduler. This prevents any unsynchronized states between the node management system and the SRS from occurring.

With an arbitrary, customer owned job management program, adding the restriction of treating node and job information as temporary could require extensive rewriting of the customer's program. Often, the local job control system maintains a set of job queues in order to track the progress of the parallel jobs on the distributed system. Once the combination of the node management system and special resource scheduler decide to start a job, the local job control system takes over to track job progress. However, the job information now exists in both the LJCS and the node management system. Should the job change states in one of these codes, the other code must become aware of the event. This communication must be tightly coupled to prevent out-of-synchronization errors where job states between the node management system and the local job control system would not match.

One solution to this problem is illustrated in the pseudocode of FIGS. 3 & 4. When a user submits a job to the LJCS, it is created on the user job queue 245. On the next pass of the SRS, the node and job queue information is first read from the node management system 210. Next, the resource scheduler compares the LJCS user job queue with the batch job queue 215. If a job exists on the LJCS queue but not on the node management system queue, a new user job has been detected. The scanner routine will then build a corresponding node management system job command file for submission to the node management system as a "marker job". The executable (a shell script) within the node management system command file contains the steps as indicated in FIG. 4. The logic within these steps ensures that the correct start-up and shut down sequences will be followed for jobs in the system. In particular, the node management system job starts first, which then launches the LJCS job. The node management system job remains running for the full duration of the LJCS job. When the LJCS job terminates either completing successfully or failing, the LJCS will shut down first prior to the node management system ending the marker job. Therefore, the period for which the node management system job is active always encompasses duration of the LJCS job.

The above-summarized processing is described in greater detail below with reference to the flowcharts of FIGS. 3a, 4a & 4b.

Figure 3A:
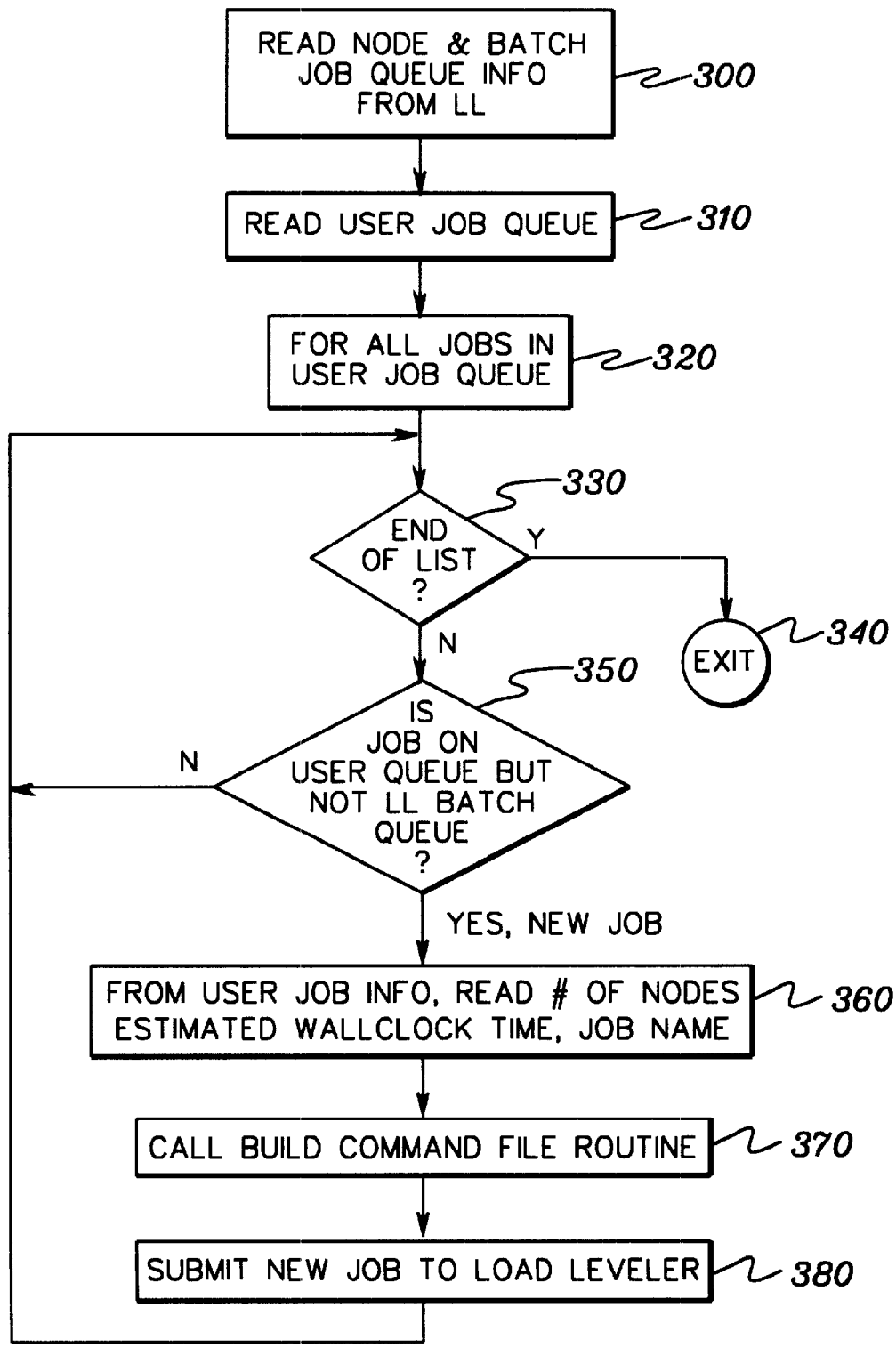
FIG. 3a is a flowchart of one embodiment of logic for detecting a user job at the local job control system.

FIG. 3a, implemented for example in SRS 230 (FIG. 2), depicts logic for detection of a user job at the LJCS. Detecting a new user job begins by reading node and batch job queue information from the node management system (designed LL in FIGS. 3a, 4a & 4b for Load Leveler) 300, and from the user job queue in the LJCS 310. For each pass 320, processing determines whether all jobs in the queue have been considered, i.e., has the end of the list been reached 330. If so, then the detection processing is complete 340.

Otherwise, processing determines whether there is a job listed on the user job queue in the LJCS but not on the batch job queue in the node management system 350. This inquiry is made for each job in the user job queue. For each new job in the user job queue, the logic next obtains its job information by reading the number of nodes required by the job from the LJCS, estimating a wall clock time required, and obtaining the job's name 360. A build command file routine is then called 370 in order to enter a corresponding marker job in the batch job queue of the node management system. Once the marker job exists in the node management system, the job is placed on the batch job queue in the node management system 380.

Figure 4A:
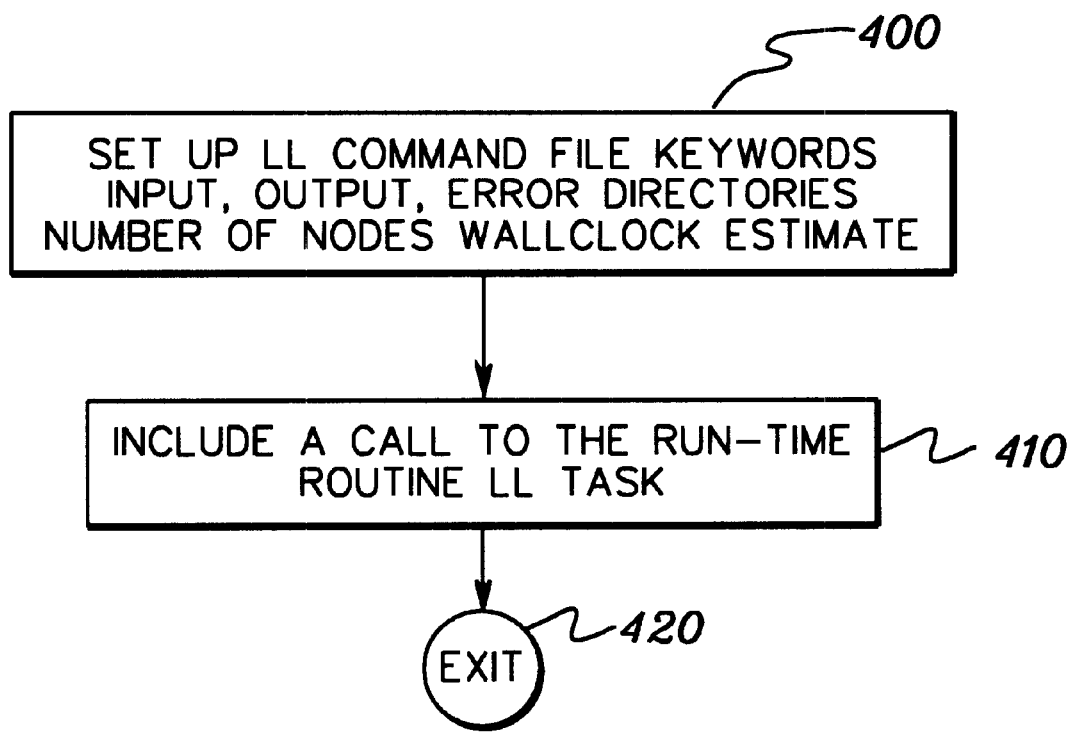
FIG. 4a is a flowchart for one embodiment of build command routine logic in accordance with the principles of the present invention.

FIG. 4a depicts logic, implemented for example within the resource scheduler 230 (FIG. 2), for setting up the build command file routine. This logic includes setting up the node management system command file key words, and input/output and error directories, number of nodes, and wall clock estimate for the new job 400. Further, the command file includes a call to the run-time routine to run the marker job on the node management system (herein LL task) 410, after which processing is complete 420.

Figure 4B:
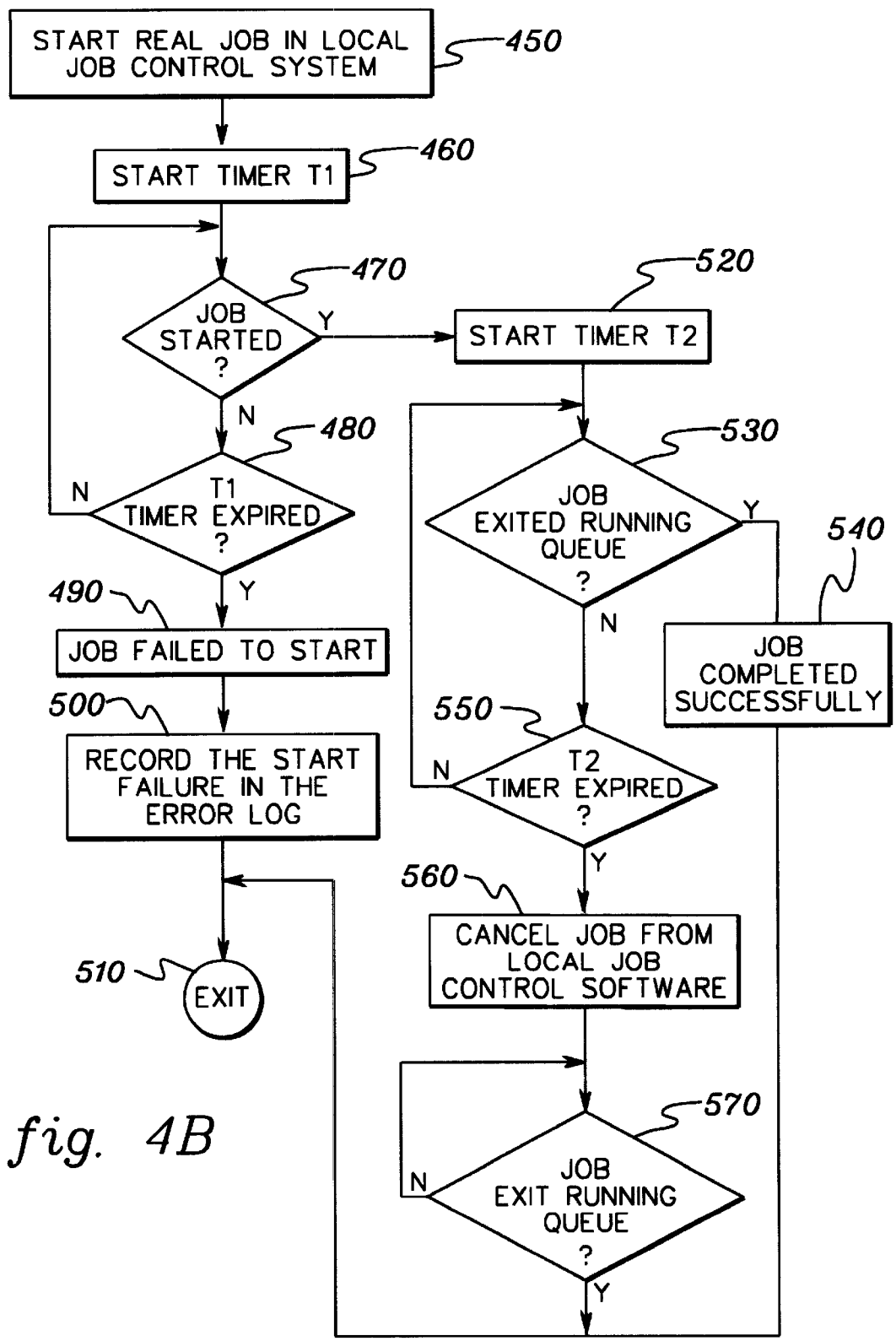
FIG. 4b is a flowchart of one embodiment of logic for node management system execution when a user job is to be run in the local job control system.

FIG. 4b depicts one embodiment for the run-time routine for running the marker job at the node management system. This logic would be implemented, in one example, within the node management system. Responsive to initiation of the marker job on the node management system, the real job in the local job control system is started 450. A timer T1 is set 460 and processing inquires whether the real job has started 470 in the LJCS. If no, processing determines whether time T1 has expired 480. If the timer does expire before the job has started, then the job has failed to start 490 and a start failure is recorded in an error log 500 maintained by the node management system, after which processing is terminated for this marker job 510.

After the job has started, a second timer T2 520 is started and processing inquires whether the job has exited the running queue in the LJCS 530. If so, then the job has completed successfully 540, and processing is terminated allowing the marker job at the node management system to then also terminate. If timer T2 has expired 550 before the job has exited the running queue in the LJCS, then an error has occurred and the job is canceled from the local job control system 560. Processing waits until the job exits the running queue 570, after which the marker job in the node management system can be terminated.

Those skilled in the art will note from the above description that the solution presented herein effectively closes any opportunity for out-of-synchronization errors occurring between the multiple codes, i.e., between the external resource scheduler, node management system, and a local job control system. Further, the local job control system code is preserved without significant changes to support synchronization between the scheduling sub-systems. By subordinating the customer code to control of the node management system/external resource scheduler, examination of node management system data provides complete information regarding the progress of the customer task.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true: spirit and scope of the invention.

What is claimed is:

1. A method for processing jobs within a distributed processing system having a local job control system (LJCS) which receives user jobs to be processed, said method comprising:

starting a marker job by a resource scheduler external to said LJCS, wherein said marker job corresponds to a user job to be run by said LJCS;

responsive to starting of said marker job by said resource scheduler, starting said user job by said LJCS; and upon termination of said user job, ending said marker job started by said resource scheduler, wherein starting of said user job by said LJCS is responsive to said resource scheduler's starting of said marker job and wherein ending of said marker job is responsive to termination of said user job.

2. The method of claim 1, further comprising determining presence of said user job at said LJCS prior to said starting of said marker job by said resource scheduler.

3. The method of claim 2, wherein said determining is initiated by said resource scheduler.

4. The method of claim 1, wherein said resource scheduler starts said marker job utilizing a node management system which is external to said resource scheduler and external to said LJCS, and wherein said marker job exists at said node management system but not said LJCS.

5. The method of claim 4, wherein said starting of said marker job is preceded by said resource scheduler submitting said marker job to a batch job queue in said node management system, and wherein said starting of said user job by said LJCS is responsive to launching of a job command file from said node management system subsequent to starting of said marker job, said job command file requesting said LJCS to start said user job on a node set of said distributed processing system, wherein running of said marker job encompasses running of said user job.

6. The method of claim 4, further comprising determining presence of said user job at said LJCS prior to starting of said marker job by said resource scheduler, wherein said determining comprises comparing user jobs in a user job queue of said LJCS with marker jobs in a batch job queue maintained by said node management system, and identifying a new user job as any job listed in said user job queue but not in said batch job queue.

7. The method of claim 6, further comprising, responsive to identifying of a new user job in said user job queue of said LJCS, obtaining job information on said new user job, including reading a number of nodes required by said new user job, estimating running time required thereby, and obtaining a job name of said new user job, and employing said job information to build a command file to initiate a new marker job at said node management system.

8. The method of claim 7, further comprising monitoring starting of said user job by said LJCS responsive to said job command file, and if said user job fails to start within a first time period, recording a start failure in an error log maintained at said node management system.

9. The method of claim 8, further comprising after starting of said user job by said LJCS, starting a second time period and monitoring for completion of said user job, and wherein said method further comprises canceling said user job from running upon expiration of said second time period without successful completion of said user job, and removing said user job from a running queue of said LJCS.

10. The method of claim 1, further comprising monitoring for failure of completion of said user job by said LJCS, and upon detecting said failure, removing said user job from a running queue of said LJCS to thereby terminate said user job, and thereafter ending said marker job initiated by said resource scheduler.

11. A system for processing jobs within a distributed system having a local job control system (LJCS) which receives user jobs to be processed, said system comprising:

a resource scheduler external to said LJCS, said resource scheduler comprising means for starting a marker job, wherein said marker job corresponds to a user job to be run by said LJCS;

means for starting said user job by said LJCS responsive to starting of said marker job by said resource scheduler; and means for ending said marker job started by said resource scheduler upon termination of said user job, wherein said means for starting of said user job by said LJCS is responsive to said resource scheduler's means for starting said marker job and wherein said means for ending said marker job is responsive to termination of said user job.

12. The system of claim 11, further comprising means for determining presence of said user job at said LJCS prior to said starting of said marker job by said resource scheduler.

13. The system of claim 12, wherein said means for determining is initiated by said resource scheduler.

14. The system of claim 11, wherein said resource scheduler starts said marker job utilizing a node management system which is external to said resource scheduler and external to said LJCS, and wherein said marker job exists at said node management system but not said LJCS.

15. The system of claim 14, wherein said resource scheduler further comprises means for submitting said marker job to a batch job queue in said node management system, and wherein said means for starting of said user job by said LJCS is responsive to launching of a job command file from said node management system subsequent to starting of said marker job, said job command file requesting said LJCS to start said user job on a node set of said distributed processing system, wherein running of said marker job encompasses running of said user job.

16. The system of claim 14, further comprising means for determining presence of said user job at said LJCS prior to starting of said marker job by said resource scheduler, wherein said means for determining comprises means for comparing user jobs in a user job queue of said LJCS with marker jobs in a batch job queue maintained by said node management system, and means for identifying a new user job as any job listed in said user job queue but not in said batch job queue.

17. The system of claim 16, further comprising, responsive to identifying of a new user job in said user job queue of said LJCS, means for obtaining job information on said new user job, including for reading a number of nodes required by said new user job, estimating running time required thereby, and obtaining a job name of said new user job, and means for employing said job information to build a command file to initiate a new marker job at said node management system.

18. The system of claim 17, further comprising means for monitoring starting of said user job by said LJCS responsive to said job command file, and if said user job fails to start within a first time period, for recording a start failure in an error log maintained at said node management system.

19. The system of claim 18, further comprising means for starting a second time period after starting of said user job by said LJCS, and for monitoring for completion of said user job, and wherein said system further comprises means for canceling said user job from running upon expiration of said second time period without successful completion of said user job, and for removing said user job from a running queue of said LJCS.

20. The system of claim 11, further comprising means for monitoring for failure of completion of said user job by said LJCS, and upon detecting said failure, for removing said user job from a running queue of said LJCS to thereby terminate said user job, and thereafter for ending said marker job initiated by said resource scheduler.

21. A system for processing jobs within a distributed processing system having a local job control system (LJCS) which receives user jobs to be processed, said system comprising;
   a scheduler module for controlling scheduling of a job for execution within said LJCS, said scheduler module being external to said LJCS and comprising computer code for:
      starting a marker job external to said LJCS, wherein said marker job corresponds to a user job to be run by said LJCS;
      responsive to starting of said marker job, initiating starting of said user job by said LJCS; and
      upon termination of said user job, ending said marker job, wherein starting of said user job by said LJCS is responsive to said scheduler's starting of said marker job and wherein ending of said marker job is responsive to termination of said user job.

22. At least one program storage device, readable by a machine, tangibly embodying at least one program of instructions executable by the machine to perform a method for processing jobs within a distributed processing system having a local job control system (LJCS) which receives user jobs to be processed, said method comprising:
   starting a marker job by a resource scheduler external to said LJCS, wherein said marker job corresponds to a user job to be run by said LJCS;
   responsive to starting of said marker job by said resource scheduler, starting said user job by said LJCS; and
   upon termination of said user job, ending said marker job started by said resource scheduler, wherein starting of said user job by said LJCS is responsive to said resource scheduler's starting of said marker job and wherein ending of said marker job is responsive to termination of said user job.

23. The at least one program storage device of claim 22, further comprising determining presence of said user job at said LJCS prior to said starting of said marker job by said resource scheduler.

24. The at least one program storage device of claim 23, wherein said determining is initiated by said resource scheduler.

25. The at least one program storage device of claim 22, wherein said resource scheduler starts said marker job utilizing a node management system which is external to said resource scheduler and external to said LJCS, and wherein said marker job exists at said node management system but not said LJCS.

26. The at least one program storage device of claim 25, wherein said starting of said marker job is preceded by said resource scheduler submitting said marker job to a batch job queue in said node management system, and wherein said starting of said user job by said LJCS is responsive to launching of a job command file from said node management system subsequent to starting of said marker job, said job command file requesting said LJCS to start said user job on a node set of said distributed processing system, wherein running of said marker job encompasses running of said user job.

27. The at least one program storage device of claim 25, further comprising determining presence of said user job at said LJCS prior to starting of said marker job by said resource scheduler, wherein said determining comprises comparing user jobs in a user job queue of said LJCS with marker jobs in a batch job queue maintained by said node management system, and identifying a new user job as any job listed in said user job queue but not in said batch job queue.

28. The at least one program storage device of claim 27, further comprising, responsive to identifying of a new user job in said user job queue of said LJCS, obtaining job information on said new user job, including reading a number of nodes required by said new user job, estimating running time required thereby, and obtaining a job name of said new user job, and employing said job information to build a command file to initiate a new marker job at said node management system.

29. The at least one program storage device of claim 28, further comprising monitoring starting of said user job by said LJCS responsive to said job command file, and if said user job fails to start within a first time period, recording a start failure in an error log maintained at said node management system.

30. The at least one program storage device of claim 29, further comprising after starting of said user job by said LJCS, starting a second time period and monitoring for completion of said user job, and wherein said method further comprises canceling said user job from running upon expiration of said second time period without successful completion of said user job, and removing said user job from a running queue of said LJCS.

31. The at least one program storage device of claim 22, further comprising monitoring for failure of completion of said user job by said LJCS, and upon detecting said failure, removing said user job from a running queue of said LJCS to thereby terminate said user job, and thereafter ending said marker job initiated by said resource scheduler.

* * * * *